(12) United States Patent
Liu

(10) Patent No.: US 8,795,414 B2
(45) Date of Patent: Aug. 5, 2014

(54) SYSTEM AND METHOD FOR DELIVERY OF SOLIDS IN A CARRIER GAS TO A GAS STREAM

(75) Inventor: Xin Liu, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 694 days.

(21) Appl. No.: 12/997,945

(22) PCT Filed: Jul. 8, 2009

(86) PCT No.: PCT/US2009/049980
§ 371 (c)(1),
(2), (4) Date: Dec. 14, 2010

(87) PCT Pub. No.: WO2010/006083
PCT Pub. Date: Jan. 14, 2010

(65) Prior Publication Data
US 2011/0097674 A1    Apr. 28, 2011

Related U.S. Application Data

(60) Provisional application No. 61/079,037, filed on Jul. 8, 2008.

(51) Int. Cl.
*B01D 53/02*     (2006.01)

(52) U.S. Cl.
USPC ............... 95/134; 95/107; 110/203; 110/345; 423/210; 96/108

(58) Field of Classification Search
USPC ............... 95/107, 134; 96/108; 110/203, 345; 423/210
See application file for complete search history.

(56) References Cited

U.S. PATENT DOCUMENTS

| 5,681,536 | A | 10/1997 | Swoboda et al. |
| 6,818,043 | B1 | 11/2004 | Chang et al. |

FOREIGN PATENT DOCUMENTS

| EP | 0956895 | 11/1999 |
| EP | 1645323 | 4/2006 |

OTHER PUBLICATIONS

Translation of EP 0956895 A1; Dohmann; 1999.*

* cited by examiner

*Primary Examiner* — Christopher P Jones
(74) *Attorney, Agent, or Firm* — Marcy M. Hoefling

(57) ABSTRACT

A process and system for feeding solids and carrier gases through the wall of a duct or chamber through which a gas stream flows to the flowing gas stream from a feed source exterior of the duct or chamber.

26 Claims, 4 Drawing Sheets

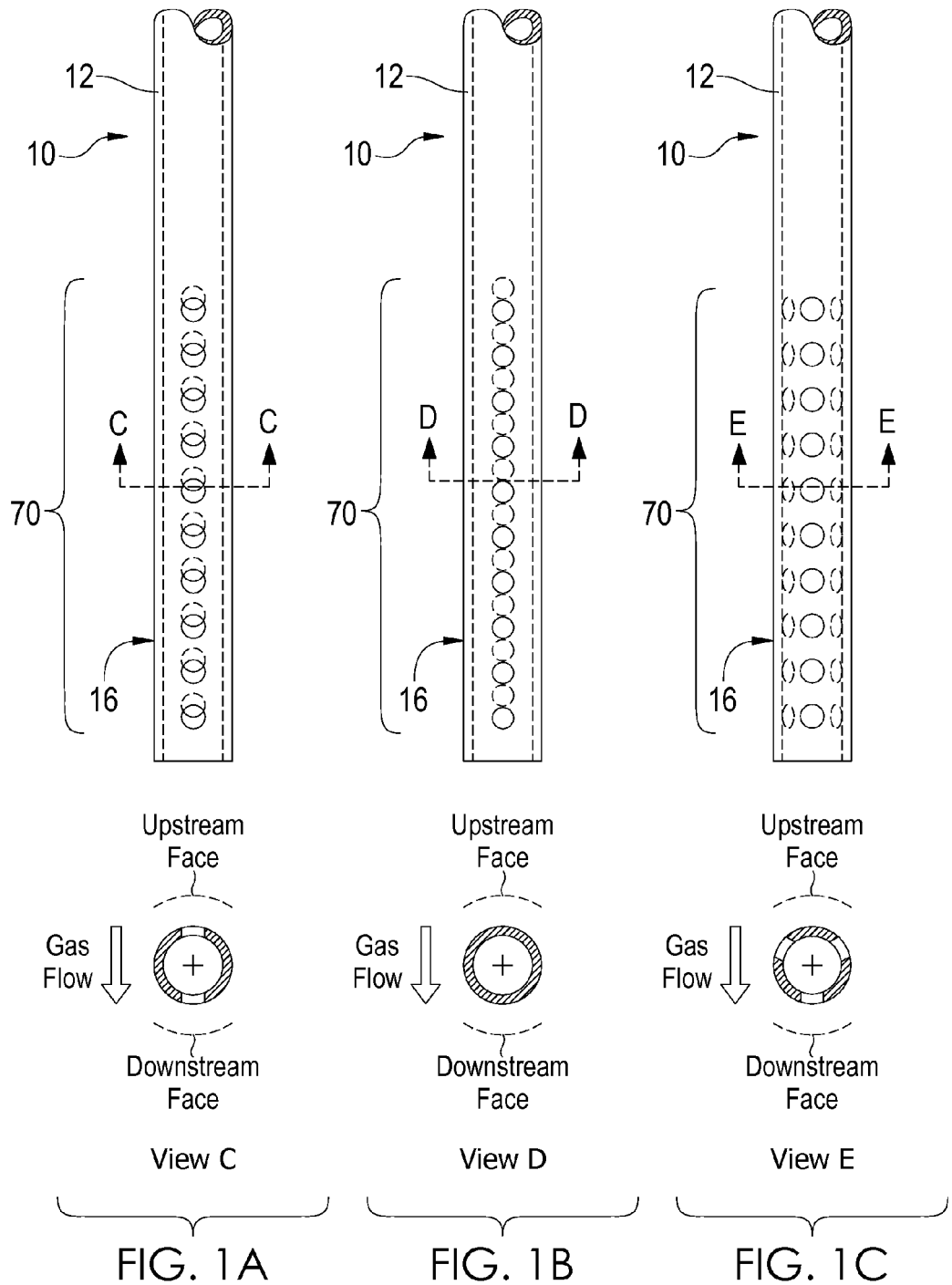

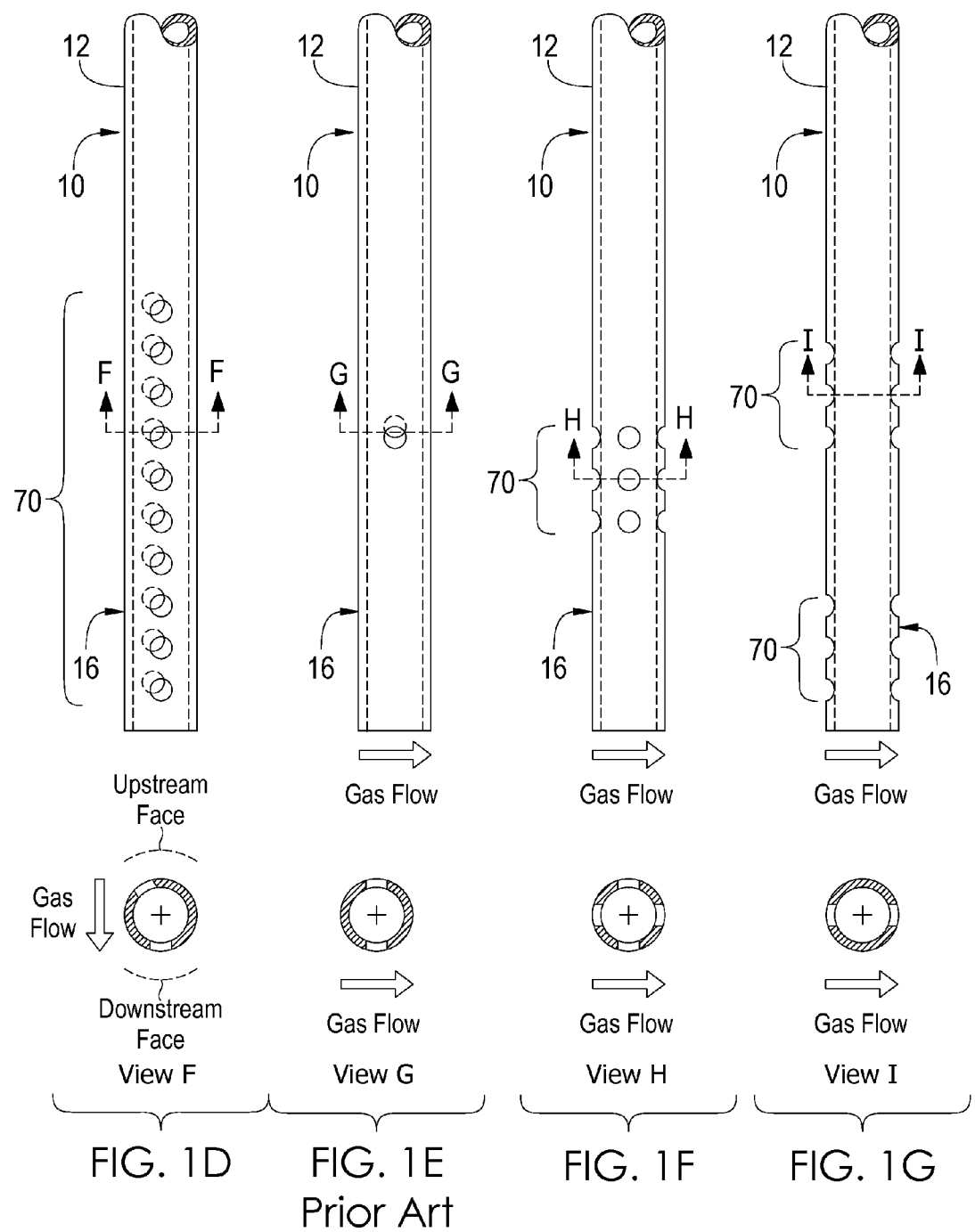

SYSTEM AND METHOD FOR DELIVERY OF SOLIDS IN A CARRIER GAS TO A GAS STREAM

REFERENCE TO RELATED APPLICATIONS

This Application claims the benefit of prior U.S. Provisional Patent Application No. 61/079,037, filed Jul. 8, 2008, the disclosure of which is incorporated herein by reference.

TECHNICAL FIELD

This invention relates to a system and method for delivery of solids and carrier gases through a duct or chamber wall into a flowing gas stream.

BACKGROUND

The engineering arts have long-used elongated hollow tubes that traverse the walls of ducts or chambers through which a gas steam flows so that the tubes can deliver feed materials, such as fine solids entrained in a carrier gas, from a source exterior of the duct or chamber to a point interior of the duct or chamber. Such elongated hollow tubes are conventionally referred to as "lances." Generally, lances have a bore through which the solids and the carrier gases flow. The bore is in delivery communication with an exterior solid and gas feed source and is open, at a point interior of the duct or chamber, to effect delivery of the solid and gas through the lance bore into the flowing gas stream, which in many cases is flowing at a high rate. While this arrangement is effective in feeding the solid and carrier gas to the flowing gas stream, wide dispersion of the feed in the gas stream is not always as fast or as extensive as is desired.

The art has responded by using multiple lances oriented so that multiple delivery points are located within the flowing gas stream across the stream cross-section. The lances may also extend to different depths into the gas stream, across the direction of gas flow. When this technique is not satisfactory, the art provides lances that have bores with multiple openings along the lance length so that each lance provides multiple delivery points along its length. Thus, there are numerous delivery points when multiple lances, each with multiple openings, are used.

However, even with multiple lances and multiple openings, there is a need for improving the uniformity of dispersion of the fed solid and carrier gas into the flowing gas stream, especially if the flowing gas stream is not in a highly turbulent condition.

SUMMARY OF THE INVENTION

This invention relates to processes for feeding a feed comprising a particulate solid and a carrier gas through the wall of a duct or chamber through which a gas stream comprising a flue gas from a combustion source is flowing and from a feed source that is exterior of the duct or chamber, which process comprises:
a. locating at least one elongated lance that is in fluid communication with the feed source and the interior of the duct or chamber at a point that intersects at least a portion of the flowing gas stream, the lance having
   (i) a longitudinal bore through which, at least in part, the fluid communication occurs,
   (ii) a downstream face orientated downstream of the flowing gas stream, the downstream face forming a plurality of downstream openings and
   (iii) an upstream face orientated upstream of the flowing gas stream, wherein the upstream face opposes the downstream face and forms a plurality of upstream openings; and
b. feeding the feed to the lance bore whereby at least a portion of the feed mixes with at least a portion of the flowing gas stream that enters at least one of the upstream openings to form a mixture in the lance bore, whereby at least a portion of the mixture then exits at least one of the downstream openings.

The phrases "solids and carrier gases" and "solid and carrier gas" are meant to include any mixture of solids and gases. For example, in a preferred embodiment the processes of this invention includes the feed of a gas suspension of solids, e.g., a suspension of air and particulate activated carbon.

This invention also relates to systems including a duct or chamber sized and configured so that a gas stream comprising a flue gas from a combustion source may flow therethrough, wherein at least one wall of the duct or chamber defines one or more duct openings. The system also includes one or more elongated lances disposed in each of the duct openings. At least one of the elongated lances is in fluid communication with (i) a feed comprising a particulate solid and a carrier gas from a feed source exterior of the duct or chamber and (ii) the interior of the duct or chamber at a point that intersects at least a portion of the gas stream. Each elongated lance has at least a longitudinal bore through which, at least in part, the fluid communication occurs, a downstream face orientated downstream of the gas stream flow, the downstream face defining a plurality of downstream openings, and an upstream face orientated upstream of the gas stream flow, wherein the upstream face opposes the downstream face and defines a plurality of upstream openings. The elongated lance is further disposed in the duct or chamber so that the feed may be fed from the feed source to the lance bore, whereby at least a portion of the feed mixes with at least a portion of the gas stream that enters at least one of the upstream openings to form a mixture in the lance bore, and at least a portion of the mixture then exits at least one of the downstream openings.

Such systems and processes are especially beneficial in obtaining good dispersions of the fed solid and carrier gas in the flowing gas stream. The use of multiple lances increases dispersion and homogeneity of the feed in the flowing gas stream. Good dispersion and homogeneity are especially useful when the feed is being used to capture components of the flowing gas stream that are present in very small amounts. Downstream homogeneity increases the statistical probability that the component to be captured is contacted by the fed material to effect the latter's capture, be it by interstitial capture, absorption, chemical reaction, etc.

The systems and processes of this invention are designed to provide the above mentioned good dispersion and homogeneity features even in the case of flowing gas streams that are art recognized as difficult to treat, e.g., a flowing flue gas from the combustion of coal, which flue gas contains small amounts (about 1 ppb) of coal-associated mercury that are released upon the combustion of the coal. Regulatory mandates may demand aggressive mercury removal to levels far below even the small amounts just mentioned, say from about fifty percent to about ninety percent.

The systems and processes of this invention are meant for handling many kinds of solids and carrier gases for feed into a flowing gas stream. In addition, the processes of this invention can improve many processes that are amenable to their use for contacting, e.g., by injection, a treating solid and carrier gas with a flowing gas stream to effect removal or reduction of unwanted gas stream components from the flowing gas stream.

Exemplary of (i) the solids and carrier gases that can be used with the systems and processes of this invention and/or (ii) the flowing gas stream treatments that can be improved upon by enhanced dispersion of the treating material in the flowing gas stream by use of the processes of this invention are those disclosed in: U.S. Pat. No. 1,984,164; U.S. Pat. No. 4,500,327; U.S. Pat. No. 5,900,042; U.S. Pat. No. 6,514,907; U.S. Pat. No. 6,808,692; U.S. Pat. No. 6,818,043; U.S. Pat. No. 6,848,374; U.S. Pat. No. 6,878,358; U.S. Pat. No. 7,435,286; U.S. Pat. No. 7,507,083; US 2002/0114749; US 2004/013589; US 2005/0039598; US 2006/0204418; US 2006/0205592; US 2007/0051239; US 2007/0140940; US 2007/0180990; US 2007/0234902; US 2007/0254807; US 2008/0107579; US 2008/0134888; EP 0 277 706; and WO 2007/149867. All of the foregoing are incorporated herein by reference as if fully set forth.

These and other features of this invention will be further apparent from the ensuing description, drawings, and appended claims.

BRIEF DESCRIPTION OF THE DRAWINGS

FIG. 1A is a front view of a downstream face of an elongated lance of this invention wherein the downstream openings are partially offset from the upstream openings along the longitudinal axis of the elongated lance; latitudinal Section C-C is also provided in the Figure.

FIG. 1B is a front view of a downstream view of an elongated lance of this invention wherein the downstream openings are offset from the upstream openings along the longitudinal axis of the elongated lance; latitudinal Section D-D is also provided in the Figure.

FIG. 1C is a front view of a downstream view of an elongated lance of this invention wherein each of the downstream openings is offset from a respective opposing plurality of the upstream openings along the latitudinal axis of the elongated lance; latitudinal Section E-E is also provided in the Figure.

FIG. 1D is a front view of a downstream view of an elongated lance of this invention wherein the downstream openings are offset from the upstream openings along the longitudinal axis and the latitudinal axis of the elongated lance; latitudinal Section F-F is also provided in the Figure.

FIG. 1E is a side view of an elongated lance known to be prior art in the field. The gas stream flows from left to right at a ninety degree angle to the feed flowing through the openings in the sidewall(s) of the elongated lance; latitudinal Section G-G is also provided in the Figure.

FIG. 1F is a side view of an elongated lance of this invention wherein a portion of the elongated lance includes a zone wherein the elongated lance defines a grouping of three sets of openings around the circumference of the elongated lance; latitudinal Section H-H is also provided in the Figure.

FIG. 1G is a side view of an elongated lance of this invention wherein the elongated lance has two zones wherein in each zone the elongated lance defines a grouping of three upstream openings on the upstream face and three downstream openings on the downstream face; latitudinal Section I-I is also provided in the Figure.

In each of the above figures, like numerals are used to refer to like or functionally like parts among the several figures.

FURTHER DETAILED DESCRIPTION OF THE INVENTION

Illustrative implementations of the invention are described below as they might be employed in the construction and use of a system and method for delivering a wider distribution of injected solid particles into selected regions of a moving gas stream according to at least one implementation of the present invention. It will be of course appreciated that in the development of such an actual implementation, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. In the detailed description below, general discussion of alternative steps, configurations, features and/or components may employ reference to numbered components identified in the accompanying figures. However, it should be appreciated that, unless otherwise explicitly noted, such alternative steps, configurations, features and/or components are not necessarily limited to the particular embodiment illustrated in the relevant figures, as the use of such number references in this context is merely for the sake of clarity.

Figure 1:
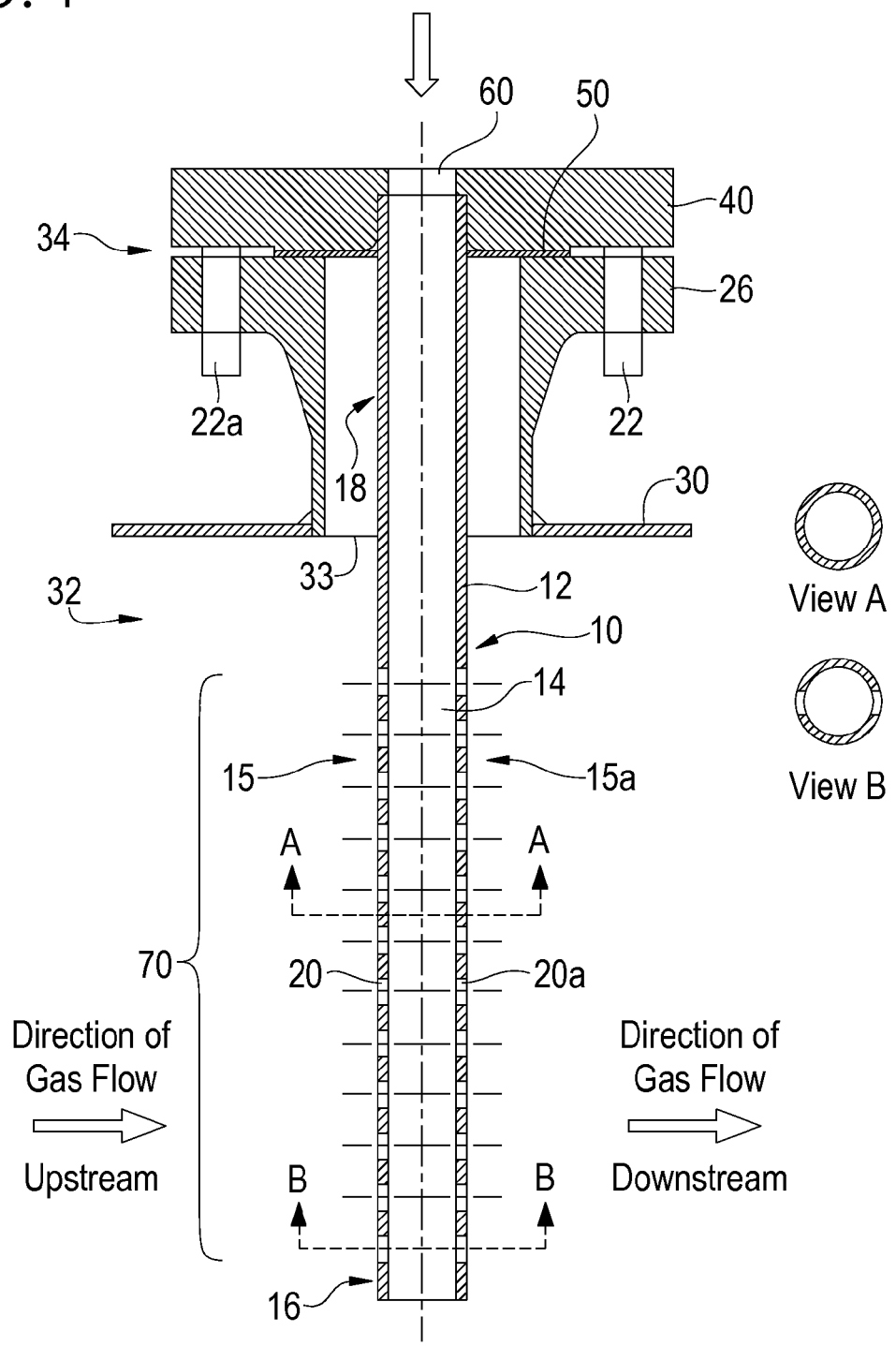
FIG. 1 is a longitudinal cross sectional view of an elongated lance of this invention disposed in a flowing gas stream within a duct carrying a gas stream; latitudinal Sections A-A and B-B are also provided in the Figure.

Referring now to FIG. 1 and/or FIGS. 1A-1D and/or FIGS. 1F-1G, there can be seen different illustrative examples of elongated lances of this invention, generally designated by the numeral 10. Lance 10 is mounted through duct wall 30 of duct 32 through which a gas stream flows in the direction indicated by the arrows in FIG. 1. Lance 10 is mounted using a mounting flange assembly, generally designated by the numeral 34.

Lance 10 has a longitudinally extending tubular body wall 12 that defines longitudinal bore 14. (As used herein the term "longitudinal" refers to an imaginary long axis of the member or finite space described or to something aligned with such an axis, while "latitudinal" refers to an imaginary short axis substantially perpendicular to an imaginary long axis of the member or finite space described or to something aligned with such an axis.) Longitudinal bore 14 has a proximate end 18 and a distal end 16. As can be seen from the Figures, longitudinal bore 14 extends from a point exterior of duct 32, at its proximate end 18, to a point interior of duct 32, at its distal end 16. Typically longitudinal bore 14 will have a latitudinal diameter (inner diameter of lance) within the range of from about one cm to about ten cm. Preferably, the elongated lance is constructed of a strong metal, such as carbon or stainless steel; however, elongated lance may be constructed from other materials, depending upon the solids and carrier gases and the atmospheric conditions involved. It should be appreciated that although the lance is illustrated as a tubular body, walls of lance 10 may form such configurations as a square, rectangle, oval, and the like when viewed from a top plan view, so long as the configured shape forms a longitudinal bore or similar passageway.

Lance 10 has a downstream face 15a and an upstream face 15 in duct 32. Lance 10 is disposed in duct 32 so that downstream face 15a is orientated downstream of the carried gas stream. Accordingly, upstream face 15 is orientated upstream of the carried gas stream and opposes downstream face 15*a*. Downstream face 15*a* of tubular body wall 12 of lance 10 further defines a plurality of downstream openings 20*a*. As shown, upstream face 15 of tubular body wall 12 of lance 10 defines a plurality of upstream openings 20. As illustrated in FIG. 1, each upstream opening 20 is coaxial with a respective downstream opening 20*a*.

It is to be understood however, that other alignments are possible, for example in FIG. 1A, the upstream openings 20 and downstream openings 20*a* are aligned so that the downstream openings are partially offset from the upstream openings along the longitudinal axis of lance 10. In another configuration shown in FIG. 1B, the upstream openings 20 and downstream openings 20*a* are aligned so that the downstream openings are further offset from the upstream openings along the longitudinal axis of lance 10. The downstream openings may be offset from the upstream openings along a latitudinal axis of the elongated lance and further may include an unequal number of upstream openings versus downstream openings. In FIG. 1C, a plurality of upstream openings 20 are offset from a respective opposing one of the downstream openings 20*a*. In still yet another configuration shown in FIG. 1D, the upstream openings 20 and downstream openings 20*a* are aligned so that the downstream openings are offset from the upstream openings along the latitudinal axis and longitudinal axis of lance 10.

As illustrated in FIG. 1E, an elongated lance 10 known in the art defines an opening on one sidewall and an opposing coaxial opening on the opposing sidewall of the lance. Both openings are orientated at a ninety degree angle from the flowing gas stream. The instant invention differs from the known art illustrated in FIG. 1E in that the invention includes both upstream openings defined by the upstream face of the elongated lance and downstream openings defined by the downstream face of the elongated lance. The present invention is advantageous over the known art because mixing the feed with the flowing gas stream from the upstream face increases the turbulence and results in a wider and more uniformed dispersion of the feed particles along the bore. The upstream and the downstream faces of the lance may each be formed from one or more sidewalls of the lance, depending upon the lance's shape in cross-section, but "upstream face" means the face or faces which are upstream of an imaginary longitudinal plane which intersects the center point of the lance bore and is perpendicular to the direction of the gas stream flow, and "downstream face" means the face or faces which are downstream of the same imaginary longitudinal plane.

As shown in FIGS. 1F and 1G, elongated lance 10 further has at least one zone in a portion of the elongated lance defining a grouping 70 of at least three or more of either of the plurality of upstream openings 20 or downstream openings 20*a*. In FIG. 1F, elongated lance 10 has a zone in a midportion of elongated lance 10 wherein the elongated lance defines a grouping of three upstream openings 20 and three respective opposing downstream openings 20*a*. FIG. 1G illustrated elongated lance 10 having a plurality of zones, namely two, wherein the elongated lance in each zone defines a grouping of three upstream openings 20 and three respective opposing downstream openings 20*a*. With respect to the present invention the term grouping is defined to be the cluster or set of either upstream openings or downstream openings that may be visually discerned as belonging to the cluster or set because of the relation in spacing amongst the cluster or set in relation to (1) other downstream openings or upstream openings defined by the elongated lance or (2) the remaining surface area of the elongated lance. The term zone as it pertains to this invention refers to that portion of the lance which defines a grouping of openings.

In the configurations wherein the downstream openings 20*a* are offset from the upstream openings 20, it is preferred that center of each of the downstream openings is offset not more than thirty degrees (30°) from the center of the respective opposing upstream opening along either of the longitudinal axis or the latitudinal axis, in either direction; however, the exact angle of offset may be chosen by the practitioner to fit the needs at hand, for example offset angles of 30° or less or 15° or less, in either direction, may be found to be favorable in practice. In addition, in alternate configurations, lance 10 may define upstream openings 20 and downstream openings 20*a*, wherein at least one downstream opening is coaxial with a respective upstream opening and at least one other downstream opening is offset from another respective upstream opening.

The upstream openings 20 defined by the lances enable the mixing of at least a portion of the gas stream flow with the flow of solid and carrier gas flowing in longitudinal bore 14. The resultant mix can exit longitudinal bore 14 through any one of more of the downstream openings 20*a* and through distal end 16 of longitudinal bore 14. Optionally, distal end 16 may be closed whereby the resultant mix may not exit therethrough. By adding duct flow gas to the carrier gas, the particle solids may be discharged further and more evenly down the longitudinal bore.

The number and size of downstream openings and upstream openings per length of longitudinal bore is not a set number and will be determined by the practitioner to meet his/her needs. Generally speaking, from about three to about thirty upstream openings and corresponding downstream openings per foot of bore 14 length will be suitable. When the target gas stream is a flue gas from a coal fired system and the processes and apparatuses of this invention are being used to reduce the mercury level of the flue gas and a powdered activated carbon in a gas suspension is being fed through lance 10 to treat the flue gas, preferably there will be from about eight to about sixteen upstream openings 20 and downstream openings 20*a* per foot of bore 14 length.

Generally, the lance 10 will define the upstream openings 20 and downstream openings 20*a* proximate the distal end of the lance. It should be appreciated that the upstream openings 20 and downstream openings 20*a* may be formed from any section of lance 10. Optionally, upstream openings 20 and downstream openings 20*a* may be defined in multiple sections of lance 10.

Preferably, the upstream openings and downstream openings will be circular in shape. The diameter of the upstream openings and downstream openings will generally be within the range of from about 0.5 to about 2.5 cm. Smaller or larger diameters may be used depending on the flowing gas stream volume, velocity, and pressure; the total number of lances; the particle size and nature of the solid; and volume and velocity of the carrier gas flowing in bore 14. Also, the number of upstream openings 20 and downstream openings 20*a* per foot of bore 14 length could have an effect on the choice of the diameter of each upstream opening and downstream opening. It is to be understood that each upstream opening 20 and downstream opening 20*a* may have a different diameter than another downstream opening or upstream opening on the same lance. Optionally, the upstream and downstream openings may be square, rectangular, slit-like, triangular, oval, or the like in shape.

As illustrated in FIG. 1, preferably, the total cross-sectional area of the downstream openings 20*a* and upstream openings 20 of lance 10 is equal to or greater than the cross-sectional area of distal end 16 of bore 14. Further as shown in FIG. 1, the upstream 20 and downstream openings 20a are preferably uniformly spaced apart from one another. Preferably, the spacing between each opening should be less than five times the internal diameter of the lance 10. The spacing between each opening in some embodiments of the invention may preferably be on the order of the internal diameter of the lance 10. It should be appreciated that the amount of spacing between openings will be determined by the practitioner to meet his/her needs. Optionally, the spacing between openings may vary in lances wherein lance 10 includes multiple sections forming upstream openings 20 and downstream openings 20a.

A mounting flange assembly, generally designated by the numeral 34, is comprised of two main portions, flange 26 and flange head 40. Flange 26, for the embodiment shown in FIG. 1, surrounds duct port 33 and is conveniently mounted by welding to duct wall 30. Mounted via bolts 22 and 22a is flange head 40, which is sized to rigidly hold lance 10 at its proximate end so that it will pass through duct port 33. Seal 50 is used to maintain a fluid tight mounting of flange head 40 to flange 26. Flange head 40 forms a flange opening 60 to receive an apparatus to feed the solids and carrier gas. The apparatus used to bring the solids and carrier gas to feed flange opening 60 can be rigid or flexible piping (not shown) as would be provided by the skilled artisan.

In operation, a feed comprised of a suspension of carrier gas and particulate activated carbon is introduced through flange opening 60 and into lance bore 14. The suspension flows through the longitudinal bore whereby at least a portion of the suspension mixes with at least a portion of the carried gas stream entering the lance bore 14 through the upstream openings 20 to form a mixture of the feed and carried gas stream. Much of the mixture exits through the downstream openings 20a. Additionally, a portion of the suspension may flow through the distal end 16 of bore 14.

For some flue gas or similar applications, the duct or chamber dimension cross sections are commonly large (e.g., twenty square meters or greater), and long elongated lances are required to introduce materials across their latitudinal cross sections. In these cases, a plurality of elongated lances are deployed in the form of array across the duct. The length of each elongated lance may be different. Each elongated lance defines a longitudinal bore, a plurality of downstream openings on the face of the lance orientated toward the downstream flowing gas stream (downstream face), and a plurality of upstream openings on the face of the lance orientated toward the upstream carried gas stream (upstream face). The number, dimensions, and locations of the upstream and downstream openings along with the number, length, and location of each elongated lance may vary based on the characteristics of, e.g., the flue gas, such as the locations in the duct where higher volumes of flue gas and mercury flow exist.

As noted before, this invention relates to a system and method for delivery of particulate solids and carrier gases through a duct or chamber wall into a flowing gas stream. The flowing gas stream may comprise a flue gas from a combustion process. In one aspect of the invention, the flue gas comprises a mercury content and the particulate solids comprise activated carbon particles that can capture at least a portion of the mercury content to enable removal of mercury from the flue gas. In another aspect of the invention, the flue gas comprises a sulfur trioxide content and the particulate solid comprises alkaline particles that can capture at least a portion of the sulfur trioxide content to enable removal of sulfur trioxide from the flue gas. In yet another aspect of the invention, the flue gas comprises a hydrochloric acid content and the particulate solid comprises alkaline particles that can capture at least a portion of the hydrochloric acid content to enable removal of hydrochloric acid from the flue gas. Examples of other particulate solids used include hydrated lime, trona, and the like. It should be appreciated that, as used herein and unless otherwise indicated expressly, "content" means an amount of the referenced substance within the limits of detection.

The following example is presented for purposes of illustration, and is not intended to impose limitations on the scope of this invention.

EXAMPLE 1

Figure 2:
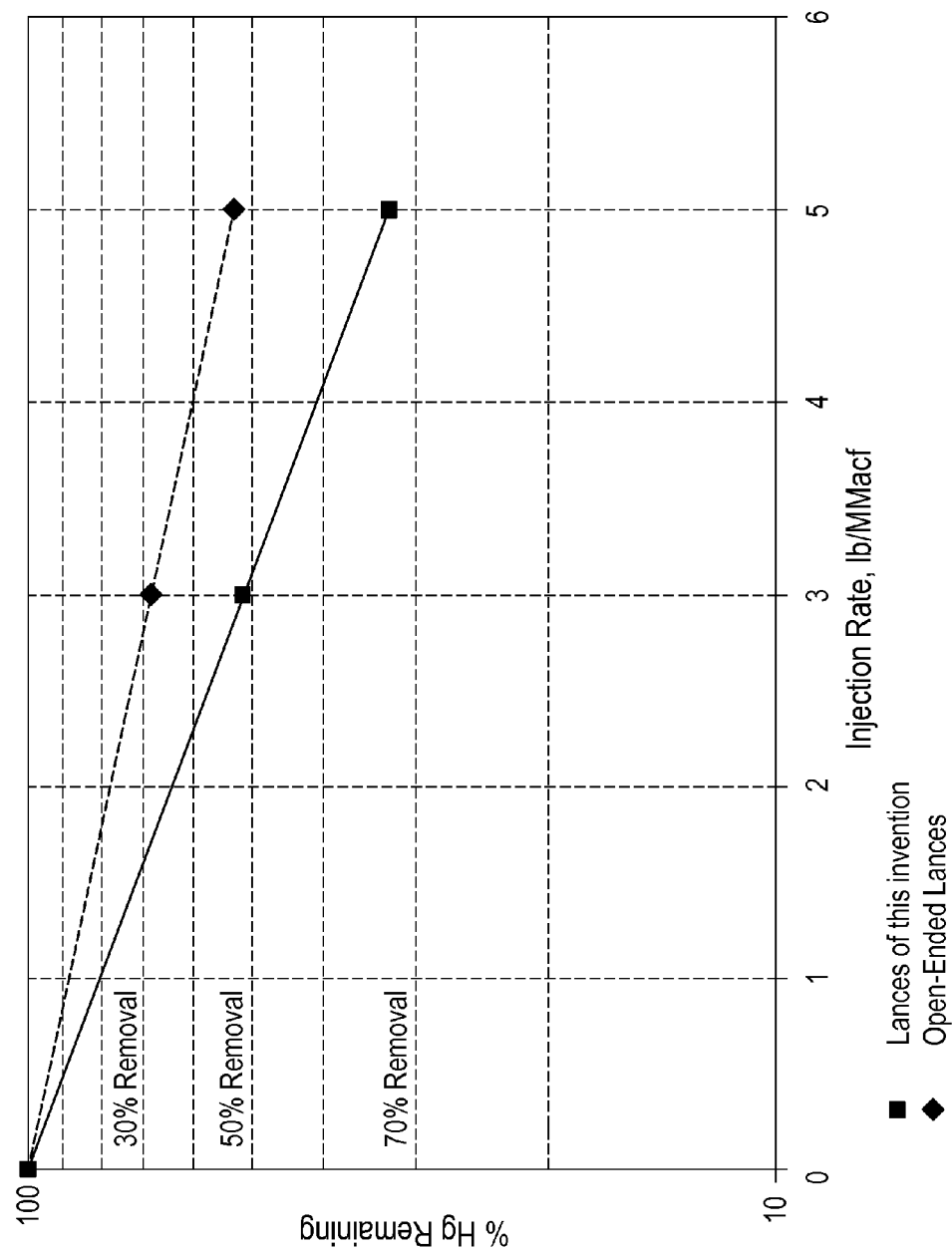
FIG. 2 is a graph comparing the relative mercury removal from the performance of the lance designs of this invention with standard lances of the prior art with data collected from the treatment of a flue gas from coal combustion with bromine gas-treated particles of activated carbon.

This example compares the use of prior art lances having only distal end openings and the use of lances of this invention for scavenging mercury from a flow of flue gas from the combustion of coal. The treating material is a bromine gas treated particulate activated carbon (sorbent) that is suspended and transported to the lances by air. As can be seen, the lances of this invention which have lance wall openings obtain better mercury removal than do those lances not having such openings. Because of the wider area of even dispersion afforded by the lances of this invention, the mercury removal is greatly enhanced, allowing less sorbent to be used in order to achieve the same mercury removal result. FIG. 2 compares the mercury removal results.

In this example, over 60% more sorbent was required with the prior art lances than with the lances of this invention. To capture 50% of the flue gas mercury with common lances, over 2.3 kilograms of sorbent per 28,000 actual cubic meters of flue gas (5 pounds of sorbent per million actual cubic feet [5 lb/MMacf]) was required. By simply substituting the lances of this invention, only about 1.4 kilograms of sorbent per 28,000 actual cubic meters of gas (3 lb/MMacf) was required.

In this example, 28 total lances were distributed in two rows at different levels of 7 lances each across two identical flue gas ducts. The cross section of each duct was approximately 7 meters by 3 meters (20 ft. by 8 ft.). The prior art lances had inside diameters of 2.5 centimeters (1 inch) and beveled open ends through which the sorbent discharged to the flowing flue gas. The lances of this invention also had inside diameters of 2.5 centimeters (1 in.). The sorbent from the novel lances, however, entered the flue gas along a 60 cm (2 ft.) length at the end of each lance through 12 downstream-facing hole openings, each 1.27 cm (0.5 in.) in diameter, spaced 5 cm (2 in.) apart. Each lance had 12 coaxial holes on its upstream and downstream faces. The upstream holes allowed flue gas to enter the lances and mix the sorbent into a turbulent zone. This added gas also helped the carrier gas propel the sorbent relatively evenly from the downstream face over the entire length of the face, allowing it to distribute more widely, more evenly, and more quickly into the flue gas, resulting in better utilization of the entrained sorbent. The results are shown in FIG. 2.

It is to be understood that the reactants and components referred to by chemical name or formula anywhere in this document, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical operation or reaction or in forming a mixture to be used in conducting a desired operation or reaction. Also, even though an embodiment may refer to substances, components and/or ingredients in the present tense ("is comprised of", "comprises", "is", etc.), the reference is to the substance, component or ingredient as it existed at the time just before it was first contacted, blended or mixed with one or more other substances, components and/or ingredients in accordance with the present disclosure.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation within the spirit and scope of the appended claims.

The invention claimed is:

1. A process for feeding a feed comprising a particulate solid and a carrier has through the wall of a duct or chamber through which a gas stream comprising a flue gas from a combustion source is flowing and from a feed source that is exterior of the duct or chamber, which process comprises:
  a. locating at least one elongated lance that is in fluid communication with the feed source and with the interior of the duct or chamber at a point that intersects at least a portion of the flowing gas stream, the lance defining at least a longitudinal bore through which, at least in part, the fluid communication occurs, the lance comprising
     (i) a downstream face orientated downstream of the flowing gas stream, the downstream face defining a plurality of downstream openings, and
     (ii) an upstream face orientated upstream of the flowing gas stream, wherein the upstream face opposes the downstream face and defines a plurality of upstream openings; and
  b. feeding the feed to the lance bore whereby at least a portion of the feed mixes with at least a portion of the flowing gas stream that enters at least one of the upstream openings to form a mixture in the lance bore, whereby at least a portion of the mixture then exits at least one of the downstream openings.

2. The process of claim 1 wherein at least one downstream is substantially coaxial with a respective opposing one of the upstream openings.

3. The process of claim 2 wherein each downstream opening is substantially coaxial with a respective opposing one of the upstream openings.

4. The process of claim 1 wherein at least one of the downstream openings is offset from a respective opposing one of the upstream openings so that the upstream opening is not coaxial with a respective downstream opening.

5. The process of claim 4 wherein the offset downstream opening is offset from the respective opposing one of the upstream openings along a latitudinal axis of the lance.

6. The process of claim 4 wherein the offset downstream opening is offset from the respective opposing one of the upstream openings along a longitudinal axis of the lance.

7. The process of claim 5 wherein the center of the offset downstream opening is offset not more than thirty degrees (30°) from the center of the respective opposing one of the upstream openings along the latitudinal axis.

8. The process of claim 6 wherein the center of the offset downstream opening is offset not more than thirty degrees (30°) from the center of the respective opposing one of the upstream openings along the longitudinal axis.

9. The process of claim 4 wherein the offset downstream opening is offset from the respective opposing one of the upstream openings along a longitudinal axis and a latitudinal axis of the lance.

10. The process of claim 1 wherein the elongated lance further comprises at least one zone in a portion of the elongated lance defining a grouping of at least three or more of either of the plurality of upstream openings or downstream openings.

11. The process of claim 1 wherein the flue gas comprises a mercury content and the particulate solid comprises activated carbon particles that can capture at least a portion of the mercury content to enable removal of mercury from the flue gas.

12. The process of claim 1 wherein the flue gas comprises a sulfur trioxide content and the particulate solid comprises alkaline particles that can capture at least a portion of the sulfur trioxide content to enable removal of sulfur trioxide from the flue gas.

13. The process of claim 1 wherein the flue gas comprises a hydrochloric acid content and the particulate solid comprises alkaline particles that can capture at least a portion of the hydrochloric acid content to enable removal of hydrochloric acid from the flue gas.

14. A system comprising
  a duct or chamber sized and configured so that a gas stream comprising a flue gas from a combustion source may flow therethrough, wherein at least one wall of the duct or chamber defines one or more duct openings; and
  one or more elongated lances disposed in each of the duct openings, at least one of the elongated lances being in fluid communication with (i) a feed comprising a particulate solid and a carrier gas from a feed source exterior of the duct or chamber and (ii) the interior of the duct or chamber at a point that intersects at least a portion of the gas stream, each elongated lance defining at least a longitudinal bore through which, at least in part, the fluid communication occurs, and each elongated lance comprising
    a downstream face orientated downstream of the gas stream flow, the downstream face defining a plurality of downstream openings, and
    an upstream face orientated upstream of the gas stream flow, wherein the upstream face opposes the downstream face and defines a plurality of upstream openings,
  wherein the elongated lance is further disposed in the duct or chamber so that the feed may be fed from the feed source to the lance bore, whereby at least a portion of the feed mixes with at least a portion of the gas stream that enters at least one of the upstream openings to form a mixture in the lance bore, and at least a portion of the mixture then exits at least one of the downstream openings.

15. The system of claim 14 wherein at least one or each downstream opening is substantially coaxial with a respective opposing one of the upstream openings.

16. The system of claim 14 wherein the downstream openings are offset from the upstream openings so that each upstream opening is not coaxial with a respective downstream opening.

17. The system of claim 16 wherein the downstream openings are offset from the respective upstream openings along a latitudinal axis of the lance.

18. The system of claim 16 wherein the downstream openings are offset from the respective upstream openings along a longitudinal axis of the lance.

19. The system of claim 17 wherein the center of the offset downstream openings is offset not more than thirty degrees (30°) from the center of the respective opposing upstream opening in either direction along the latitudinal axis or along the longitudinal axis.

20. The system of claim 16 wherein the downstream opening is offset from the respective opposing upstream opening along a longitudinal axis and a latitudinal axis of the lance.

21. The system of claim 14 wherein the elongated lance further comprises at least one zone in a portion of the elongated lance defining a group of at least three or more of either of the plurality of upstream openings or downstream openings.

22. The system of claim 14 wherein the flue gas comprises a mercury content and the particulate solid comprises activated carbon particles that can capture at least a portion of the mercury content to enable removal of mercury from the flue gas.

23. The system of claim 14 wherein the flue gas comprises a sulfur trioxide content and the particulate solid comprises alkaline particles that can capture at least a portion of the sulfur trioxide content to enable removal of sulfur trioxide from the flue gas.

24. The system of claim 14 wherein the flue gas comprises a hydrochloric acid content and the particulate solid comprises alkaline particles that can capture at least a portion of the hydrochloric acid content to enable removal of hydrochloric acid from the flue gas.

25. A process for improving the uniformity of dispersion of a continuous feed of particulate solids and a carrier gas through the wall of a duct or chamber defining an interior space, which process comprises:
   a) passing said feed into an upstream port of at least one elongated lance having at its, distal end a downstream exit port, said lance being disposed so that it penetrates the wall of said duct or chamber carrying a flow of flue gas transverse to the orientation of said lance;
   b) having said at least one lance defining and providing within the interior space of the duct or chamber, a plurality of openings disposed in at least two radially separate rows along a portion of the length of the lance within the interior of said duct or chamber with at least one said row being on an upstream side of the lance relative to the flow within said duct or chamber and another of said rows being on a downstream side of the lance relative to the flow within said duct or chamber thereby generating and maintaining turbulence of the contents within the lance; and
   c) having said turbulent contents within the lance exit from the lance in the form of substantially uniformly dispersed particulate solids in a gaseous mixture as said contents exit from said at least one lance and enter into the flow of said flue gas within said duct or chamber.

26. A process as in claim 25 wherein the flue gas comprises a mercury content and the particulate solids comprise finely-divided activated carbon particles.

* * * * *

UNITED STATES PATENT AND TRADEMARK OFFICE
CERTIFICATE OF CORRECTION

| | |
|---|---|
| PATENT NO. | : 8,795,414 B2 |
| APPLICATION NO. | : 12/997945 |
| DATED | : August 5, 2014 |
| INVENTOR(S) | : Xin Liu |

It is certified that error appears in the above-identified patent and that said Letters Patent is hereby corrected as shown below:

In the Claims

Column 9, line 34, Claim 1 reads has and should read -- gas --.

Signed and Sealed this
Fourteenth Day of July, 2015

Michelle K. Lee
*Director of the United States Patent and Trademark Office*